F. G. WITHROW & J. P. WEEKS.
DIMMER FOR AUTO HEADLIGHTS.
APPLICATION FILED NOV. 6, 1916.

1,236,809.

Patented Aug. 14, 1917.

Inventors
Floyd G. Withrow
John P. Weeks
By Moulton & Lurance
Attorneys

UNITED STATES PATENT OFFICE.

FLOYD G. WITHROW AND JOHN P. WEEKS, OF GRAND RAPIDS, MICHIGAN.

DIMMER FOR AUTO-HEADLIGHTS.

1,236,809.  Specification of Letters Patent.  Patented Aug. 14, 1917.

Application filed November 6, 1916. Serial No. 129,736.

*To all whom it may concern:*

Be it known that we, FLOYD G. WITHROW and JOHN P. WEEKS, citizens of the United States of America, residing at Grand Rapids, in the county of Kent and State of Michigan, have invented certain new and useful Improvements in Dimmers for Auto-Headlights; and we do hereby declare the following to be a full, clear, and exact description of the invention, such as will enable others skilled in the art to which it appertains to make and use the same.

This invention relates to a construction for controlling and dimming the brilliancy of electric lights and is especially adapted for use with the headlights on motor vehicles. In operation of such vehicles at night through the city streets or on meeting another vehicle it is desirable that the brilliancy or intensity of the light from the headlights be diminished. And our invention relates to a new and improved structure adapted to be interposed in the usual lighting circuit for attaining this end, it being possible through the structure which we have produced to have the lights either at their full or diminished intensity for any desired length of time. Another object and purpose of the invention resides in a construction of a new and improved device by means of which this control may be attached at the upper end of a steering post substantially in the center of the steering wheel; and further in so constructing this mount that a resistance coil of high resistance wire used in dimming the lights may be cooled and kept from overheating or burning out. Other objects and purposes of the invention including many novel details of structure and operation will appear as complete understanding of the invention is had, reference being made to the accompanying drawing illustrating a preferred embodiment of the same in which:

Like reference characters refer to like parts throughout the several views of the drawings.

Figure 2:
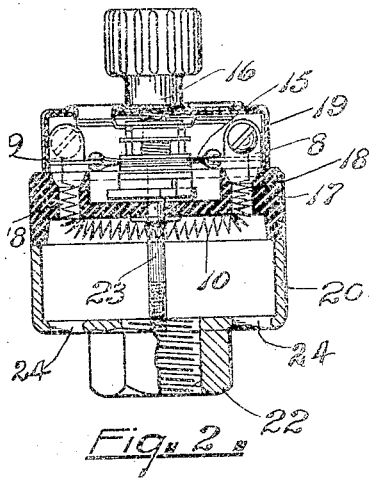
Fig. 2 is a vertical sectional view through our light control.
Figure 4:
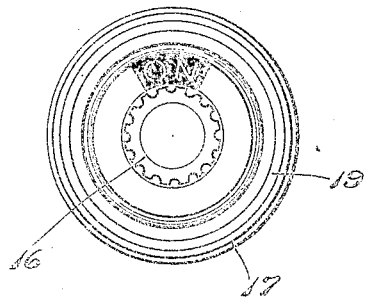
Fig. 4 is a plan view of the structure shown in Fig. 2.
Figure 3:
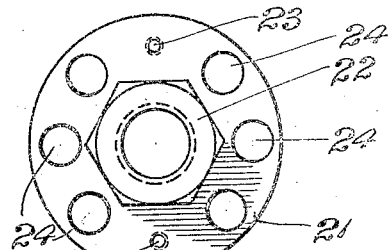
Fig. 3 is an under plan view of the same.
Figure 5:
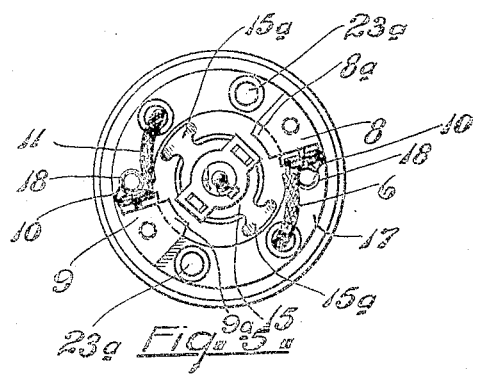
Fig. 5 is a plan view with the upper housing and operating handle removed.

In the lighting system to which our invention may be applied headlights 1 and 2 are connected by a wire 3 while from one of the headlights, as 2, a wire 4 leads to any suitable ground 5. A wire 6 leads from the other headlight having interposed therein any suitable form of make and break switch 7.

Our control device includes separated contact and binding post members 8 and 9, connected by a coil 10 of high resistance wire. Wire 6 is secured to post 8. From the post 9 a wire 11 leads to any suitable source of electrical energy illustrated in the diagram as a dynamo 12. The circuit is completed by a wire 13 leading from the dynamo to the ground 14.

A switch member 15 having oppositely projecting contacts $15^a$ is rotatively mounted and may be operated by the handle 16. The members 8 and 9 and member 15 are mounted upon a base 17 of suitable insulating material. The members 8 and 9 are located above the base while the coil 10 connected thereto at the ends passes through vertical openings 18 formed in the base, the major portion of the coil being located below said base. Any suitable housing or cover 19 may be used to cover the upper mechanism of the control.

The base 17 is located above a cup-like member having sides 20 and bottom 21 from the center of which projects a boss 22 interiorly bored and threaded to permit its attachment to the upper screw threaded end of the steering post of motor vehicles, the usual nut threaded on such posts being removed.

Base 17 is permanently secured to this member by screws 23 passed down through holes $23^a$ in the base and threaded into suitable openings in the bottom 21 of said member. The bottom 21 is further provided with a plurality of comparatively large openings 24.

Figure 1:
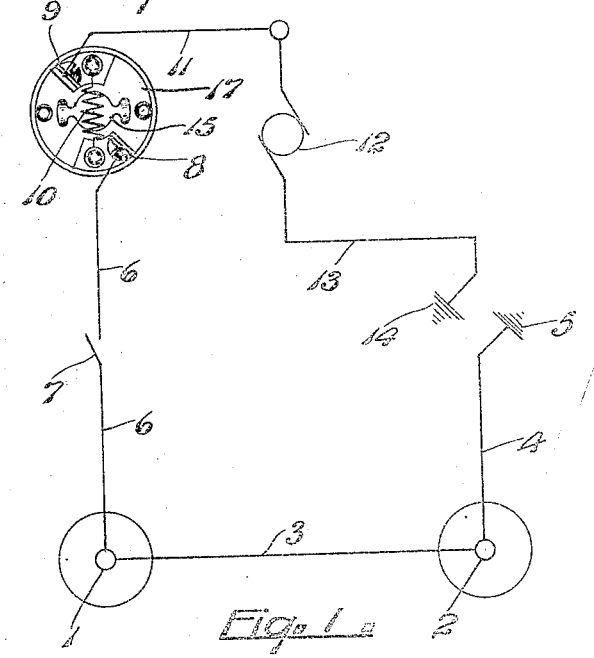
Figure 1 is a diagrammatic layout of a lighting system with our invention applied thereto.
Figure 6:
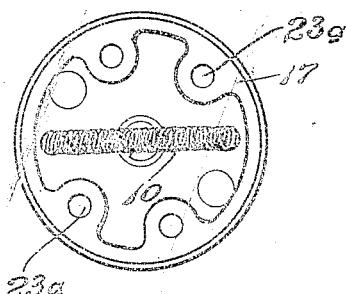
Fig. 6 is an under plan view of the member shown in Fig. 5.

When the switch 7 is closed and the member 15 occupies the position shown in Fig. 1, the current is passed through the resistance coil 10 and the intensity of the light in lights 1 and 2 is diminished, due to the decrease in current by reason of the high resistance. By turning member 15 so that its contacts $15^a$ engage with the projecting contacts $8^a$ and $9^a$ of members 8 and 9, a circuit is made which includes the member 15, the current then passing through both the member 15 and the coil 10. As the resistance through the member 15 is very small compared to that through the resistance coil the major portion of the current passes therethrough and a more intense and brilliant light in lights 1 and 2 is produced. When the current is passing through the resistance coil alone a considerable amount of heat is generated in the coil, but the ventilating openings 24 allow the circulation of air below the base 17 thereby cooling the coil and preventing any undesirable results on account of the heat generated.

We claim:—

1. In a device of the character described, a switch including separated contact members, a resistance interposed between and connecting said members, a base of insulating material on the upper side of which said contact members are located, a connecting member for said contact members movably mounted on the base, said resistance passing through the base at both ends and lying under the base, and a member connected to and below the base provided with a centrally located and downwardly projecting boss, said boss being provided with means for attachment to a support, substantially as described.

2. In a device of the character described, a switch including a base of insulating material, separated contact members secured to the upper side of the base, a coil of high resistance wire located between and connecting the contact members, the major portion of the coil being located below said base with the ends passing through the base to the contact members, a movable connecting element rotatively mounted above the base and adapted to be moved to connect said contact members together, a cup-like member provided in the bottom thereof with a plurality of ventilating openings secured to and below the base, and means on said member for attaching the same to a support, substantially as described.

In testimony whereof we affix our signatures.

FLOYD G. WITHROW.
JOHN P. WEEKS.